(No Model.) 4 Sheets—Sheet 1.

H. A. W. WOOD.
MECHANICAL MOVEMENT.

No. 570,586. Patented Nov. 3, 1896.

Witnesses
Chas. F. Schmelz
E. M. Healy

Inventor
H. A. Wise Wood,
By his Attorney
Louis W. Southgate (No Model.)  H. A. W. WOOD.  4 Sheets—Sheet 4.
MECHANICAL MOVEMENT.

No. 570,586.  Patented Nov. 3, 1896.

Witnesses  
Inventor  
H. A. Wise Wood,  
By his Attorney  
Louis W. Southgate

UNITED STATES PATENT OFFICE.

HENRY A. WISE WOOD, OF NEW YORK, N. Y., ASSIGNOR TO THE CAMPBELL PRINTING PRESS AND MANUFACTURING COMPANY, OF NEW YORK.

MECHANICAL MOVEMENT.

SPECIFICATION forming part of Letters Patent No. 570,586, dated November 3, 1896.

Application filed July 9, 1892. Serial No. 439,524. (No model.)

*To all whom it may concern:*

Be it known that I, HENRY A. WISE WOOD, a citizen of the United States, residing at New York, in the county of New York and State of New York, have invented a new and useful Improvement in Mechanical Movements, of which the following is a specification.

The aim of this invention is to produce a new and improved means for converting rotary motion into rectilinearly-reciprocating motion; and to this end the invention consists of the device described and claimed in this specification and illustrated in the accompanying drawings, in which—

Figure 1:
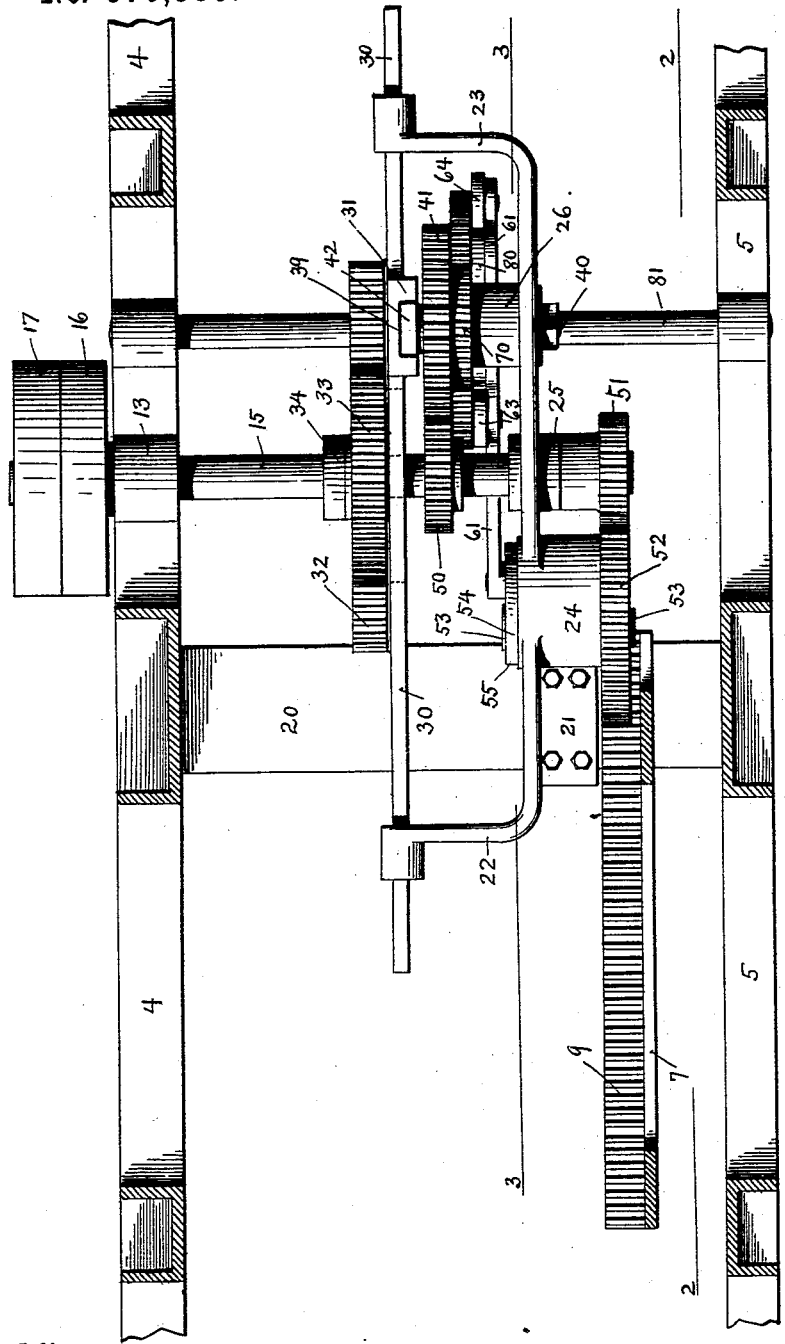
Figure 2:
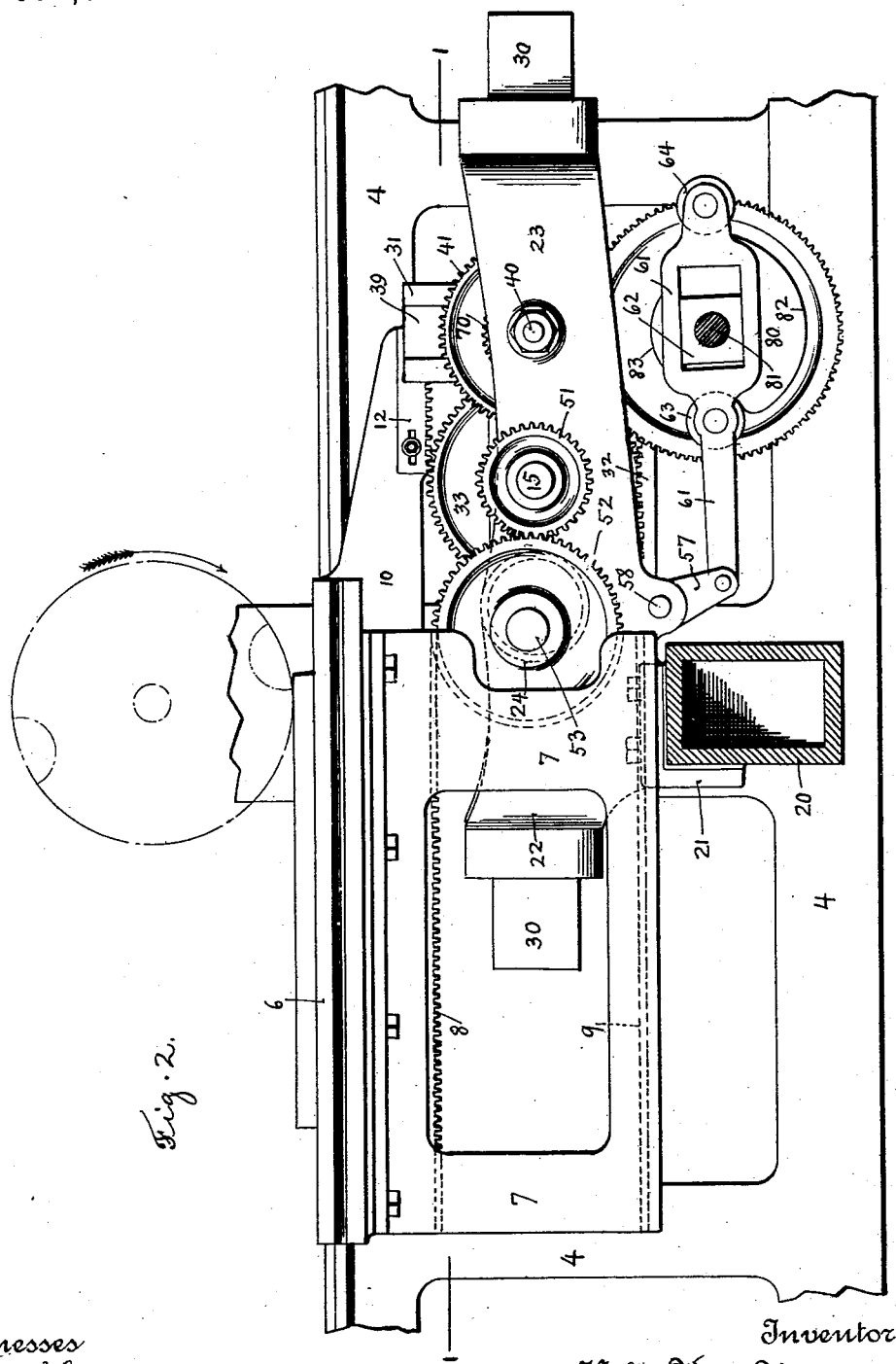
Figure 3:
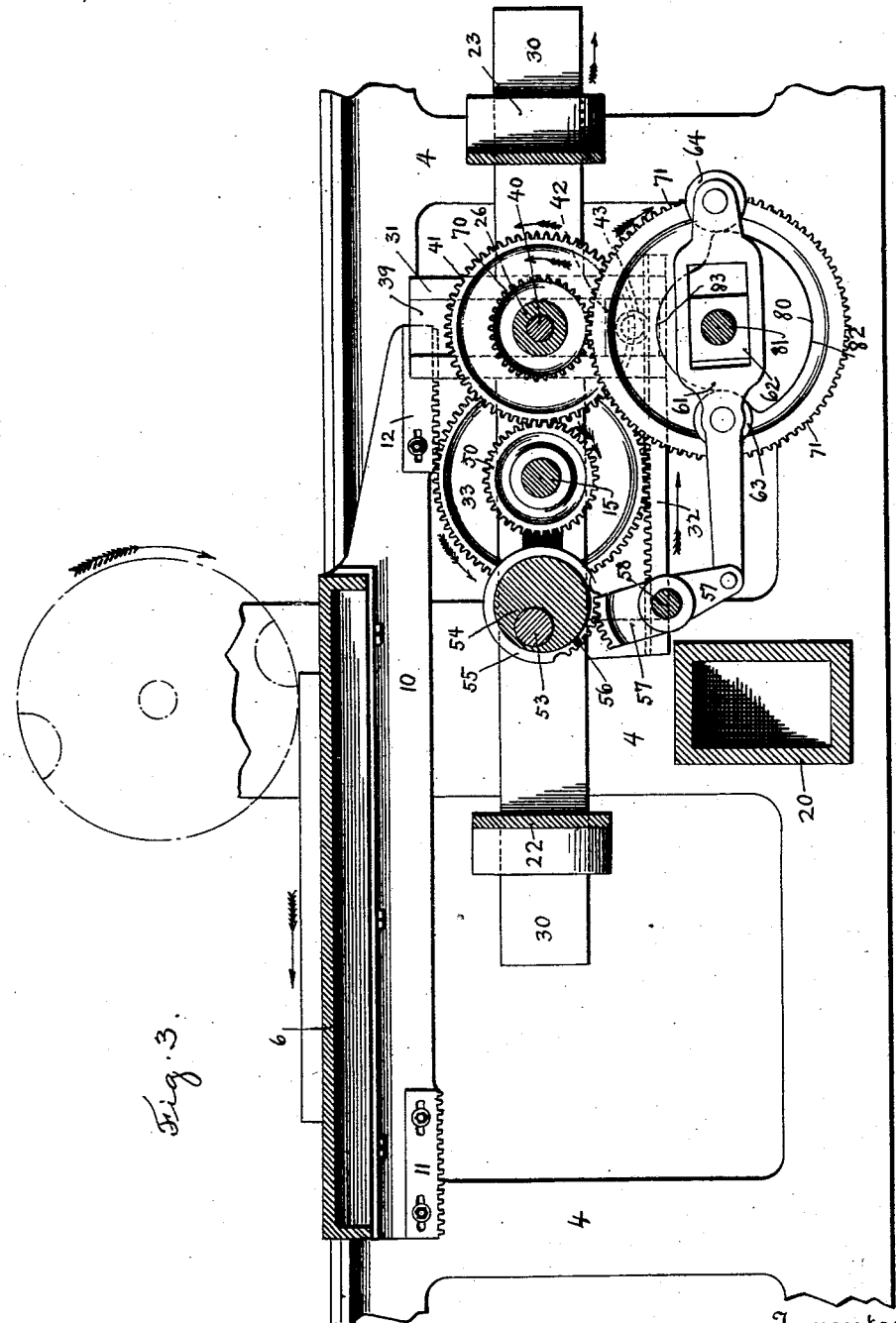
Figure 4:
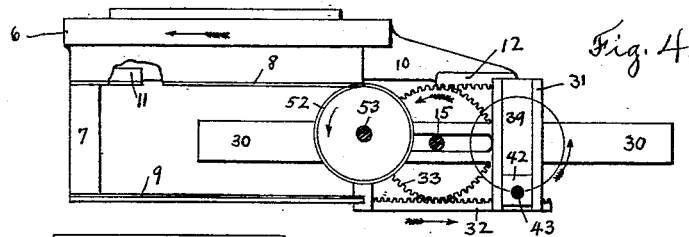
Figure 5:
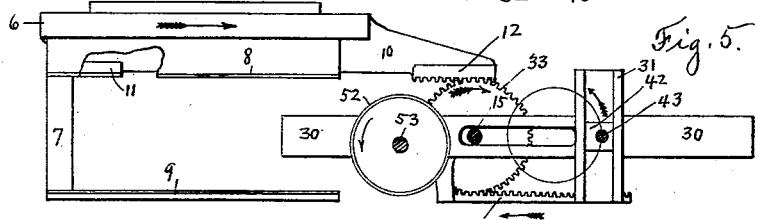
Figure 6:
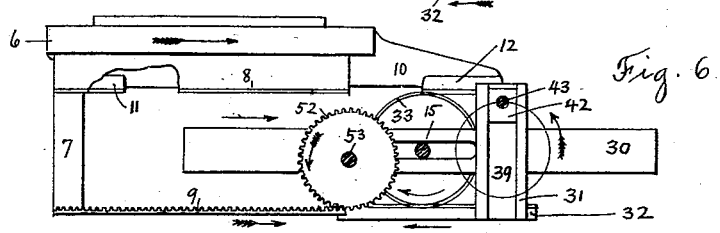
Figure 7:
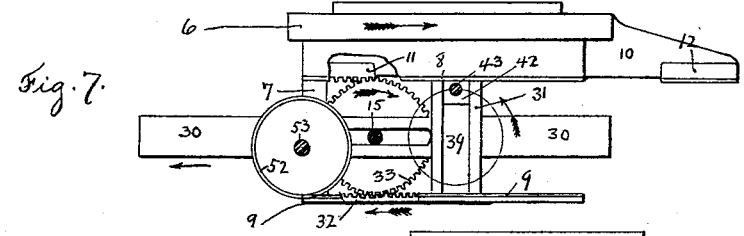
Figure 8:
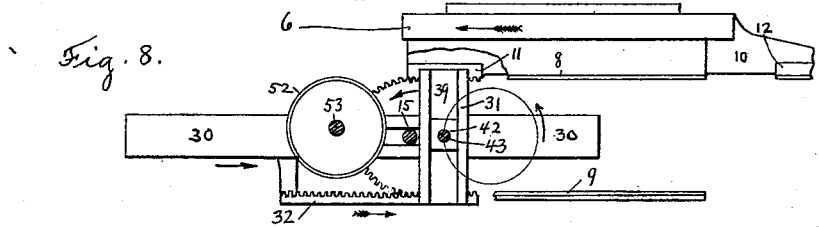
Figure 9:
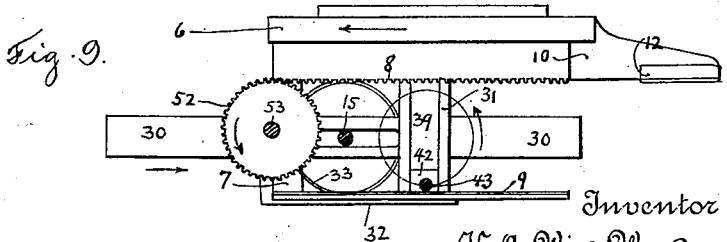

Figure 1 is a sectional plan taken on line 1 1 of Fig. 2. Fig. 2 is a sectional elevation taken on line 2 2 of Fig. 1. Fig. 3 is a sectional elevation taken on line 3 3 of Fig. 1; and Figs. 4 to 9, inclusive, are diagrams on a reduced scale illustrating the different positions that the parts assume during the operation.

My invention, strictly speaking, relates to a mechanical movement for converting rotary motion into rectilinearly-reciprocating motion, and the same may be applied and adapted to any use or location where it is desired to use such a movement; but with this understanding I will state that my invention has been principally devised for use in connection with reciprocating beds of printing-presses, and with the understanding that the same may be applied and used in any desired connection without departing from the scope of my invention I will further describe my invention as applied and used in connection with a printing-press.

A printing-press bed, to secure the best results, must be run at an even speed during the forward and return stroke, and must be gradually stopped and started again in the reverse direction without jar or vibration. Therefore I provide a mechanism that will gradually retard the bed to a state of rest and then start the same in an opposite direction at a gradually-accelerated speed, and use this mechanism in combination with a mechanism that is adapted to give the bed its direct or principal reciprocation, which mechanism will hereinafter be termed the "direct driving" mechanism, and the other or auxiliary mechanism will be termed the "reversing" mechanism.

This invention is a further carrying out or modification of the device shown, described, and claimed in the application of Winfield S. Huson for a mechanical movement, filed March 31, 1892, Serial No. 427,151, and I have shown in my device the same direct driving mechanism that is shown, described, and claimed in the said application referred to; but it will be understood that I may use any direct driving mechanism that will give the bed a forward and backward movement, and therefore I will not here describe the direct driving mechanism at length.

My reversing mechanism specifically consists of an oscillating member or gear which is oscillated about a fixed axis at a speed commencing at the same speed at which the bed is moved by the direct driving mechanism and gradually is retarded to a state of rest, and then started in the opposite direction at a speed gradually accelerating from a state of rest to the maximum, or the speed imparted to the bed by the direct driving mechanism.

I may use any means to actuate or vibrate the oscillating member. The specific means that I have shown consists of a vibrating yoke which carries a rack which is adapted to engage teeth on the vibrating or oscillating member, and this yoke is vibrated by means of a crank, whereby the vibrating or oscillating member will have the particular motion referred to.

Referring now to the drawings and in detail, I will describe one specific mechanism that is adapted to illustrate and show how my invention may be carried out.

In said drawings the usual side frames of a printing-press are designated by the numerals 4 and 5, and on these side frames 4 and 5 the reciprocating member or bed 6 is mounted so as to reciprocate back and forth in any of the usual manners common in printing-presses. This bed 6 has secured to the under side of the same the rack-frame 7, and on this rack-frame 7 are mounted the two parallel oppositely disposed or facing driving-racks 8 and 9. Secured to the under side of the reciprocating member or bed 6 is another frame or bracket 10, which carries the short racks 11 and 12, for a purpose hereinafter described. Formed or fastened to the side frame 4 is a bearing or journal-box 13, and in this bearing and a bearing 25, hereinafter referred to, is mounted the shaft 15, which is the driving-shaft of the machine and on which may be mounted the usual tight and loose pulleys 16 and 17, by which power may be transmitted to the device. A suitable tie-beam 20 connects the side frames 4 and 5, and on this tie-beam is mounted the bracket 21, which has the extending arms 22 and 23 and bearings 24, 25, and 26 formed therewith. In the bearing 25 runs the shaft 15, as before described.

The arms 22 and 23 are extended, as shown, to form bearings, and in these bearings are mounted the arms 30 of the reciprocating or vibrating yoke 31, and on the back of this yoke 31 is formed or fastened the rack 32, which rack 32 meshes with the under side of a gear 33, loosely mounted on shaft 15 and held in place laterally on said shaft 15 between the collar 34 and the yoke 31, whereby said gear 33 is free to turn on a fixed axis.

Mounted in the bearing 26 is a shaft 40, and on this shaft 40 is mounted the gear 41 and the pinion 70, and this gear and pinion are connected so as to turn together. The gear 41 is driven from pinion 50, which is fastened on shaft 15, and the reduction between this pinion and gear in the particular device under consideration is one to two. Fastened on the side of the gear 41 is a bracket which carries a crank-pin 43, which crank-pin 43 is set on the pitch radius of said gear, and which crank-pin 43 carries a suitable block 42 thereon, which block fits in a vertical slot 39, formed in the face of the yoke 31. Thus it will be seen that the yoke 31 will be reciprocated back and forth at a speed the resultant of a crank movement, and that thereby the gear 33 will be oscillated at this particular speed, and the gear 33 is adapted to coact with the short racks 11 and 12, as hereinafter described, to gradually retard, stop, and reverse the movement of the bed.

Fastened on the shaft 15 is a pinion 51, which meshes with gear 52, which gear 52 is mounted on a shaft 53, which shaft 53 is mounted in the eccentric bushing 54, and this gear 52 coöperates with the racks 8 and 9 and forms the direct driving mechanism of the machine.

The eccentric bushing has formed on the back side thereof the flange 55, and this flange 55 has teeth 56 formed thereon, which teeth 56 are adapted to coact with teeth formed on the end of the vibrating lever 57, which lever 57 is mounted on a stud 58, secured in the bracket 21. The pinion 70 meshes into a gear 71, which is fastened on a shaft 81, which is journaled in brackets on the side frames, and on this shaft is mounted the cam 80. A yoke 61 is mounted on a square block 62, mounted on shaft 81, and the yoke has rollers 63 and 64, which engage cam 80. The cam 80 has two surfaces 82 and 83, as shown, which are connected by easy inclines, and as the cam makes one complete revolution it will move the yoke 61 forward and back. This motion of the yoke will impart a vibrating motion to the lever 57, and will thus oscillate the bushing 54 and will raise and lower gear 52 to alternately engage with racks 8 and 9. This is substantially the direct mechanism of the Huson application before referred to and will not be further described at length in this case.

The reduction between the pinion 51 and gear 52 is two to one, and the reduction between the pinion 50 and gear 41 is also two to one, and the reduction between the pinion 70 and the gear 71, mounted on the shaft 81, is three to one. The gears 41 and 52 are of the same size.

By the reduction between the pinion 70 and gear 71 it will be noted that the cam 80 will turn once for each three revolutions of gear 52, whereby the gear 52 in the particular device under consideration will make one complete turn in mesh with each of the racks 8 or 9, which racks 8 and 9 are of a length equal to the pitch circumference of said gear 52 and a half-turn for each reversal; but this proportion of gearing and number of turns that gear 52 is to make can of course be greatly varied by a skilful designer without departing from the broad scope of my invention.

The operation of my device is apparent and is as follows: Referring to the diagrammatic figures, in Fig. 4 the bed is shown as just completing the direct stroke to the left, the gear 52 just leaving the rack 8 and the oscillating gear 33 just engaging the rack 12 to commence the reverse movement. In this position of the parts the crank-pin 43 is at the lowest extreme, as shown, and the yoke is moving to the right at a speed equal to the peripheral speed of gear 52, whereby the gear 33 will properly engage the rack 12 and move the bed to the left at a speed commencing at the maximum and gradually decreasing to zero as the crank 43 approaches its center, or until the parts assume the position shown in Fig. 5. In other words, by a quarter-revolution of the crank-pin the bed is gradually retarded and brought to a state of rest in a further movement a distance equal to the radius of the crank-pin 43 or a pitch radius of gear 52. Now during the next quarter-revolution of the crank-pin the slider will be moved to the left a distance equal to said crank radius at a speed gradually increasing from zero to the maximum, or until the parts assume the position shown in Fig. 6, the motion being transmitted to the bed by means of the rack 32 and the oscillating gear 33. During this reversing action the cam 80 has oscillated the bushing 54 and the gear 52 has been lowered to just engage the rack 9. Now during the next revolution of gear 52 the bed will be moved to the right a distance equal to the pitch circumference of said gear 52, or until the parts assume the position shown in Fig. 7. In this position the gear 52 is just leaving the rack 9 and the gear 33 is just engaging the rack 11 to commence the reversing movement, the crank-pin in this position being at its upper extreme and the yoke or slider moving to the left at the maximum speed, whereby the top of the gear 33 is being turned toward the right. Now during the next quarter-revolution of the gear 41 or gear 52 the bed will be moved to the right a distance equal to a pitch radius at a speed commencing at the maximum and gradually decreasing to zero, or until the parts assume the position shown in Fig. 8, which is the right-hand extreme of the motion of the bed. Now during the next quarter-revolution of the crank-pin 43 the yoke or slider will be moved to the left a distance equal to a pitch radius at a speed commencing at zero and gradually accelerating to the maximum, and by means of rack 32 and oscillating gear 33 this motion will be communicated to the bed and the parts will be brought to assume the position shown in Fig. 9. During this last half-revolution of gears 41 or 52 the cam 80 will oscillate the bushing 54 to raise the gear 52, so that the same will just engage the rack 8, as shown. Now during the next complete revolution of gear 52 the bed will be moved to the left a distance equal to the pitch circumference of the gear 52, or will be moved until its parts assume the position shown in Fig. 4, thus completing the cycle. Thus it will be seen that the gear 52 makes three turns for each complete reciprocation of the bed, one turn for the direct reciprocation in either direction and a half-turn for each reversal. Of course this proportion may be varied and the gear 52 be made to make as many turns as desired, depending upon the length of run which is wanted.

In the particular device under consideration it will be seen that the complete movement of the bed in either direction will be the circumference of gear 52 plus two pitch radii or a pitch diameter. Thus it will be seen that the bed will be given a direct forward and backward movement, and that the same will be reversed by gradually retarding the same to a state of rest, and then gradually starting the same in a reverse direction at an accelerated speed. This motion is therefore especially adapted for reciprocating parts which gain considerable inertia while in motion, as the reversing mechanism will change the movement without jar.

Any mechanism that will oscillate or vibrate the gear or oscillating member 33 may be used without departing from the broad scope of my invention as expressed in the claims, and, as before stated, any direct driving mechanism for the bed may be used, as my invention is independent thereof, but relates to the combination with any direct driving mechanism or a particular reversing mechanism.

Having thus fully described my invention, what I claim, and desire to secure by Letters Patent, is—

1. The combination with the reciprocating bed or member and mechanism for reciprocating the same, of a reversing mechanism consisting of a gear having a fixed axis, means for oscillating the same, and a rack carried by the bed with which said gear is adapted to engage to reverse the movement thereof, substantially as described.

2. The combination with a reciprocating bed or member, of mechanism for reciprocating the same, a member reciprocating back and forth, a gear having an axis oscillated from said reciprocating member, and a rack carried by the bed with which said oscillating gear may engage to reverse the movement of the bed, substantially as described.

3. The combination with the reciprocating bed or member, of mechanism for reciprocating the same, a member reciprocating back and forth, and carrying a rack, a gear engaging said rack, and a rack carried by the bed with which the gear is adapted to engage to reverse the movement of the bed, substantially as described.

4. The combination with the reciprocating bed or member, of mechanism for reciprocating the same, a reciprocating slider, a crank connected to reciprocate the same, an oscillating gear actuated from said slider, and a rack carried by the bed with which said oscillating gear is adapted to engage, whereby said oscillating gear may reverse the movement of the bed, substantially as described.

5. The combination with the reciprocating bed or member, of a mechanism for reciprocating the same, and a reversing mechanism consisting of a slider, a crank connected to actuate the same, a gear oscillated by said slider, and two racks on the bed with which said oscillating gear is adapted to engage, whereby the bed may be reversed in either direction, substantially as described.

6. The combination with the reciprocating bed or member and mechanism for reciprocating the same, of a reversing mechanism consisting of a slider, a crank mechanism for actuating the slider, a rack carried by the slider, an oscillating gear which said rack engages, and two racks on said reciprocating bed or member with which said oscillating gear is adapted to engage whereby said oscillating gear may reverse the movement of said reciprocating bed or member in either direction, substantially as described.

In testimony whereof I have hereunto set my hand in the presence of two subscribing witnesses.

H. A. WISE WOOD.

Witnesses:
LOUIS W. SOUTHGATE,
E. M. HEALY.